United States Patent
Fuentes (10) Patent No.: US 10,053,108 B2
(45) Date of Patent: Aug. 21, 2018

(54) CONTROLLING TRANSMISSIONS OF VEHICLE OPERATION INFORMATION

(71) Applicant: XL Hybrids, Boston, MA (US)

(72) Inventor: Erick William Fuentes, Cambridge, MA (US)

(73) Assignee: XL Hybrids, Boston, MA (US)

( * ) Notice: Subject to any disclaimer, the term of this patent is extended or adjusted under 35 U.S.C. 154(b) by 0 days.

(21) Appl. No.: 15/369,395

(22) Filed: Dec. 5, 2016

(65) Prior Publication Data

US 2017/0174222 A1 Jun. 22, 2017

Related U.S. Application Data

(63) Continuation of application No. 14/179,237, filed on Feb. 12, 2014, now Pat. No. 9,511,778.

(51) Int. Cl.
| | |
|---|---|
| *B60W 40/00* | (2006.01) |
| *B60W 40/09* | (2012.01) |
| *G07C 5/00* | (2006.01) |
| *B60W 50/04* | (2006.01) |
| *B60W 50/00* | (2006.01) |

(52) U.S. Cl.
CPC ............ *B60W 40/09* (2013.01); *B60W 50/04* (2013.01); *G07C 5/008* (2013.01); *B60W 2050/0058* (2013.01); *B60W 2520/10* (2013.01); *B60W 2520/105* (2013.01); *B60W 2540/10* (2013.01); *B60W 2540/12* (2013.01); *B60W 2750/40* (2013.01)

(58) Field of Classification Search
None
See application file for complete search history.

(56) References Cited

U.S. PATENT DOCUMENTS

| | | | | |
|---|---|---|---|---|
| 5,172,785 A | * | 12/1992 | Takahashi | B60K 28/06 180/271 |
| 5,546,305 A | * | 8/1996 | Kondo | B60R 16/0231 340/439 |
| 5,991,675 A | * | 11/1999 | Asanuma | B60G 17/0195 180/422 |
| 7,292,152 B2 | * | 11/2007 | Torkkola | G08B 21/06 340/426.2 |
| 7,389,178 B2 | * | 6/2008 | Raz | G07C 5/085 340/903 |
| 7,444,311 B2 | * | 10/2008 | Engstrom | G05B 13/027 706/20 |
| 7,765,058 B2 | * | 7/2010 | Doering | B60R 16/0236 340/425.5 |

(Continued)

*Primary Examiner* — Jonathan M Dager (74) *Attorney, Agent, or Firm* — Fish & Richardson P.C.

(57) ABSTRACT

A system includes a computing device with memory configured to store instructions and a processor to execute the instructions for operations that include receiving data representative of one or more operational parameters from a vehicle. Operations also include assigning a score to one or more of the received operational parameters. Operations also include determining if one or more predefined event has occurred based on the score assigned to the one or more received operational parameters of the vehicle. If at least one event is determined to occurred, operations include transmitting data representing the one or more operational parameters to a vehicle information service provider located external from the vehicle.

22 Claims, 6 Drawing Sheets

(56) References Cited

U.S. PATENT DOCUMENTS

| | | | |
|---|---|---|---|
| 7,769,499 B2* | 8/2010 | McQuade | G07C 5/008 701/1 |
| 7,809,487 B2* | 10/2010 | Syed | B60T 8/174 701/70 |
| 8,024,085 B2* | 9/2011 | Yamagata | A61B 5/02055 180/272 |
| 8,031,063 B2* | 10/2011 | Schmitz | B60K 31/047 340/439 |
| 8,058,953 B2 | 11/2011 | Sakuma Tsuyoshi | 701/41 |
| 8,068,953 B2* | 11/2011 | Sakuma | B60W 40/09 180/443 |
| 8,135,507 B2* | 3/2012 | Okabe | A61B 5/165 180/272 |
| 8,155,568 B2 | 4/2012 | Xing et al. | 701/123 |
| 8,155,868 B1* | 4/2012 | Xing | G07C 5/0808 340/439 |
| 8,175,772 B2* | 5/2012 | Onuma | B62D 6/008 180/402 |
| 8,290,697 B2* | 10/2012 | Coughlin | B60W 40/09 345/157 |
| 8,503,972 B2* | 8/2013 | Haler | G01S 5/0009 455/103 |
| 8,520,069 B2* | 8/2013 | Haler | B60R 1/12 340/293 |
| 8,554,468 B1* | 10/2013 | Bullock | G01S 19/14 340/438 |
| 8,576,062 B2* | 11/2013 | Yamaoka | B60W 50/0098 340/439 |
| 8,654,468 B2 | 2/2014 | Morling | G01S 19/14 340/438 |
| 8,718,621 B2* | 5/2014 | Ross | H04M 7/0024 455/414.1 |
| 8,996,234 B1* | 3/2015 | Tamari | G07C 5/0808 701/123 |
| 9,111,316 B2* | 8/2015 | Fernandes | G08G 5/0039 |
| 9,129,460 B2* | 9/2015 | McClellan | G07C 5/008 |
| 9,201,842 B2* | 12/2015 | Plante | G07C 5/008 |
| 9,226,004 B1* | 12/2015 | Plante | H04N 21/23406 |
| 9,344,683 B1* | 5/2016 | Nemat-Nasser | B60R 11/04 |
| 9,780,967 B2* | 10/2017 | Sargent | H04L 12/66 |
| 2002/0120374 A1* | 8/2002 | Douros | G07C 5/0808 701/34.4 |
| 2002/0151297 A1* | 10/2002 | Remboski | B60R 16/0231 455/414.1 |
| 2004/0088090 A1* | 5/2004 | Wee | G07C 5/085 701/33.4 |
| 2004/0088091 A1 | 5/2004 | Wee | G08G 1/205 701/33.4 |
| 2004/0203696 A1* | 10/2004 | Jijina | G01C 21/26 455/420 |
| 2004/0236474 A1* | 11/2004 | Chowdhary | G06Q 30/0601 701/1 |
| 2005/0027423 A1* | 2/2005 | Minami | G01F 9/023 701/51 |
| 2005/0137757 A1* | 6/2005 | Phelan | G01M 17/00 701/1 |
| 2006/0053038 A1* | 3/2006 | Warren | G06Q 40/08 705/4 |
| 2006/0212195 A1* | 9/2006 | Veith | G06Q 10/06 701/33.4 |
| 2007/0001831 A1* | 1/2007 | Raz | B60R 16/0231 340/439 |
| 2007/0027726 A1 | 2/2007 | Warren et al. | 705/4 |
| 2007/0124332 A1* | 5/2007 | Ballesty | B61L 27/0094 |
| 2007/0136078 A1* | 6/2007 | Plante | G06Q 10/00 348/148 |
| 2007/0145619 A1 | 6/2007 | Lin et al. | 303/146 |
| 2007/0145819 A1* | 6/2007 | Lin | B60T 8/172 303/146 |
| 2007/0173994 A1* | 7/2007 | Kubo | G07C 5/0858 701/32.4 |
| 2007/0213886 A1* | 9/2007 | Zhang | B60W 40/09 701/1 |
| 2007/0257782 A1* | 11/2007 | Etcheson | G07C 5/008 340/425.5 |
| 2007/0257815 A1* | 11/2007 | Gunderson | G08G 1/16 340/903 |
| 2007/0268158 A1* | 11/2007 | Gunderson | G06Q 40/08 340/933 |
| 2007/0271105 A1* | 11/2007 | Gunderson | G06Q 10/087 705/1.1 |
| 2007/0290867 A1* | 12/2007 | Kuramori | B60Q 9/00 340/576 |
| 2008/0105482 A1* | 5/2008 | Yamaguchi | G05B 15/02 180/271 |
| 2008/0133121 A1* | 6/2008 | Sato | F02D 41/00 701/123 |
| 2008/0167775 A1* | 7/2008 | Kuttenberger | B60R 21/01542 701/36 |
| 2008/0255888 A1* | 10/2008 | Berkobin | G06Q 40/08 705/4 |
| 2009/0182460 A1* | 7/2009 | O'Neal | G08C 17/00 701/2 |
| 2010/0055649 A1* | 3/2010 | Takahashi | B60W 50/082 434/66 |
| 2010/0191411 A1* | 7/2010 | Cook | G07C 5/085 701/31.4 |
| 2010/0209883 A1* | 8/2010 | Chin | G09B 19/167 434/65 |
| 2010/0209885 A1* | 8/2010 | Chin | G09B 19/167 434/65 |
| 2010/0209888 A1* | 8/2010 | Huang | B60W 40/09 434/65 |
| 2010/0209889 A1* | 8/2010 | Huang | B60W 40/09 434/65 |
| 2010/0209890 A1* | 8/2010 | Huang | G09B 9/05 434/65 |
| 2010/0209891 A1* | 8/2010 | Lin | G09B 9/05 434/66 |
| 2010/0209892 A1* | 8/2010 | Lin | G09B 9/05 434/71 |
| 2010/0211270 A1* | 8/2010 | Chin | B60W 40/09 701/44 |
| 2010/0238009 A1* | 9/2010 | Cook | G06Q 10/10 340/439 |
| 2011/0040447 A1* | 2/2011 | Horiuchi | B62D 6/007 701/41 |
| 2011/0077028 A1* | 3/2011 | Wilkes, III | B60W 50/14 455/456.3 |
| 2011/0093159 A1* | 4/2011 | Boling | G06Q 10/06 701/29.6 |
| 2011/0250876 A1* | 10/2011 | Doherty | H04W 8/245 455/419 |
| 2011/0251752 A1* | 10/2011 | DeLarocheliere | G07C 5/008 701/31.4 |
| 2011/0260884 A1* | 10/2011 | Yi | G07C 5/008 340/870.02 |
| 2012/0004804 A1* | 1/2012 | Beams | G01S 5/0027 701/32.7 |
| 2012/0083947 A1* | 4/2012 | Anderson | B60W 30/09 701/3 |
| 2012/0215375 A1* | 8/2012 | Chang | B60W 50/14 701/1 |
| 2012/0303254 A1* | 11/2012 | Kirsch | G07C 5/0808 701/123 |
| 2013/0006469 A1* | 1/2013 | Green | G07C 5/008 701/36 |
| 2013/0245880 A1* | 9/2013 | McQuade | G07C 5/008 701/32.4 |
| 2013/0274950 A1* | 10/2013 | Richardson | G08G 1/0112 701/1 |
| 2013/0345927 A1* | 12/2013 | Cook | G07C 5/085 701/33.4 |
| 2014/0129426 A1* | 5/2014 | Lamb | G06Q 20/342 705/39 |
| 2014/0210625 A1* | 7/2014 | Nemat-Nasser | G08B 21/06 340/575 |

(56) References Cited

U.S. PATENT DOCUMENTS

| | | | |
|---|---|---|---|
| 2014/0214264 A1* | 7/2014 | Campagna | G07C 5/008 701/32.3 |
| 2014/0222245 A1 | 8/2014 | Chang | 701/1 |
| 2014/0226010 A1* | 8/2014 | Molin | G06Q 10/06 348/148 |
| 2014/0358436 A1* | 12/2014 | Kim | B60W 30/12 701/532 |
| 2015/0112546 A1* | 4/2015 | Ochsendorf | B60W 50/14 701/33.4 |

* cited by examiner

CONTROLLING TRANSMISSIONS OF VEHICLE OPERATION INFORMATION

CROSS-REFERENCE TO RELATED APPLICATIONS

This application is a continuation application, and claims benefit under 35 USC 120 to, U.S. application Ser. No. 14/179,237, filed on Feb. 12, 2014. The content of this application is hereby incorporated by reference in its entirety.

BACKGROUND

This description relates to techniques for controlling the transmissions of operational information from vehicles for remote processing and analysis.

With the increased interest in reducing dependency on fossil fuels, the use of alternative energy sources has been incorporated into various applications, such as transportation. Both public and private transportation vehicles have been developed to run on fuels other than traditional petroleum based fuels (i.e., petrol, diesel, etc.). Some vehicles solely use alternative energy sources while others combine the functionality of petroleum based systems with alternative energy based systems (e.g., electrical, biofuel, natural gas, etc.). Along with being potentially more cost-effective and having more abundant resources, such alternative energy sources and their byproducts are considered to be more environmentally friendly.

SUMMARY

The systems and techniques described here relate to controlling the transmission of operational information from a vehicle to one or more external locations. Through such control, information associated with events of interest (e.g., abrupt braking of the vehicle, sudden accelerations, etc.) may be sent for analysis. Additionally, by controlling such transmissions, bandwidth use can be expanded for particular events and conserved during periods of normal vehicle operation. Correspondingly, memory and storage needs are reduced since the amount of transmission data is increased for the predefined event or events, and then returned to a reduced level. Once received, the data may be used in a variety of analysis including developing techniques to improve the performance (e.g., efficiency) of various types of vehicles.

In one aspect, a computing device-implemented method includes receiving data representative of one or more operational parameters from a vehicle. The method also includes assigning a score to one or more of the received operational parameters. The method also includes determining if one or more predefined event has occurred based on the score assigned to the one or more received operational parameters of the vehicle. If at least one event is determined to occurred, the method also includes transmitting data representing the one or more operational parameters to a vehicle information service provider located external from the vehicle.

Implementations may include any or all of the following features. Determining if one or more predefined event has occurred may include incrementing a count to represent each occurrence of a respective event. Determining if one or more predefined event has occurred may include determining if a count limit has been attained. Transmitting data representing the one or more operational parameters may include adjusting a previously used transmission technique. The method may also include upon transmitting data representing the one or more operational parameters to the vehicle information service provider, resetting a count. The method may also include upon transmitting data representing the one or more operational parameters to the vehicle information service provider, returning to operate with a previously used transmission technique. At least one of the one or more operational parameters may represent displacement of a pedal of the vehicle. At least one of the one or more operational parameters may represent speed of the vehicle. At least one of the one or more operational parameters may represent acceleration of the vehicle. Determining if one or more predefined event has occurred is performed by a controller located in the vehicle.

In another aspect, a system includes a computing device with memory configured to store instructions and a processor to execute the instructions for operations that include receiving data representative of one or more operational parameters from a vehicle. Operations also include assigning a score to one or more of the received operational parameters. Operations also include determining if one or more predefined event has occurred based on the score assigned to the one or more received operational parameters of the vehicle. If at least one event is determined to occurred, operations include transmitting data representing the one or more operational parameters to a vehicle information service provider located external from the vehicle.

Implementations may include any or all of the following features. Determining if one or more predefined event has occurred may include incrementing a count to represent each occurrence of a respective event. Determining if one or more predefined event has occurred may include determining if a count limit has been attained. Transmitting data representing the one more operational parameters may include adjusting a previously used transmission technique. The processor may be capable of executing the instructions to perform operations that include upon transmitting data representing the one or more operational parameters to the vehicle information service provider, resetting a count. The processor may be capable of executing the instructions to perform operations that include upon transmitting data representing the one or more operational parameters to the vehicle information service provider, returning to operate with a previously used transmission technique. At least one of the one or more operational parameters may represent displacement of a pedal of the vehicle. At least one of the one or more operational parameters may represent speed of the vehicle. At least one of the one or more operational parameters may represent acceleration of the vehicle. Determining if one or more predefined event has occurred may be performed by a controller located in the vehicle.

In another aspect, one or more computer readable media storing instructions that are executable by a processing device, and upon such execution cause the processing device to perform operations that include receiving data representative of one or more operational parameters from a vehicle. Operations also include assigning a score to one or more of the received operational parameters. Operations also include determining if one or more predefined event has occurred based on the score assigned to the one or more received operational parameters of the vehicle. If at least one event is determined to occurred, operations may also include transmitting data representing the one or more operational parameters to a vehicle information service provider located external from the vehicle.

Implementations may include any or all of the following features. Determining if one or more predefined event has occurred may include incrementing a count to represent each occurrence of a respective event. Determining if one or more predefined event has occurred may include determining if a count limit has been attained. Transmitting data representing the one more operational parameters may include adjusting a previously used transmission technique. The processing device may perform operations further including upon transmitting data representing the one or more operational parameters to the vehicle information service provider, resetting a count. The processing device may performs operations further including upon transmitting data representing the one or more operational parameters to the vehicle information service provider, returning to operate with a previously used transmission technique. At least one of the one or more operational parameters may represent displacement of a pedal of the vehicle. At least one of the one or more operational parameters may represent speed of the vehicle. At least one of the one or more operational parameters may represent acceleration of the vehicle. Determining if one or more predefined event has occurred may be performed by a controller located in the vehicle.

These and other aspects, features and various combinations may be expressed as methods, apparatus, systems, means for performing functions, program products, and in other ways.

Other features and advantages will be apparent from the description and the claims.

DETAILED DESCRIPTION

Figure 1:
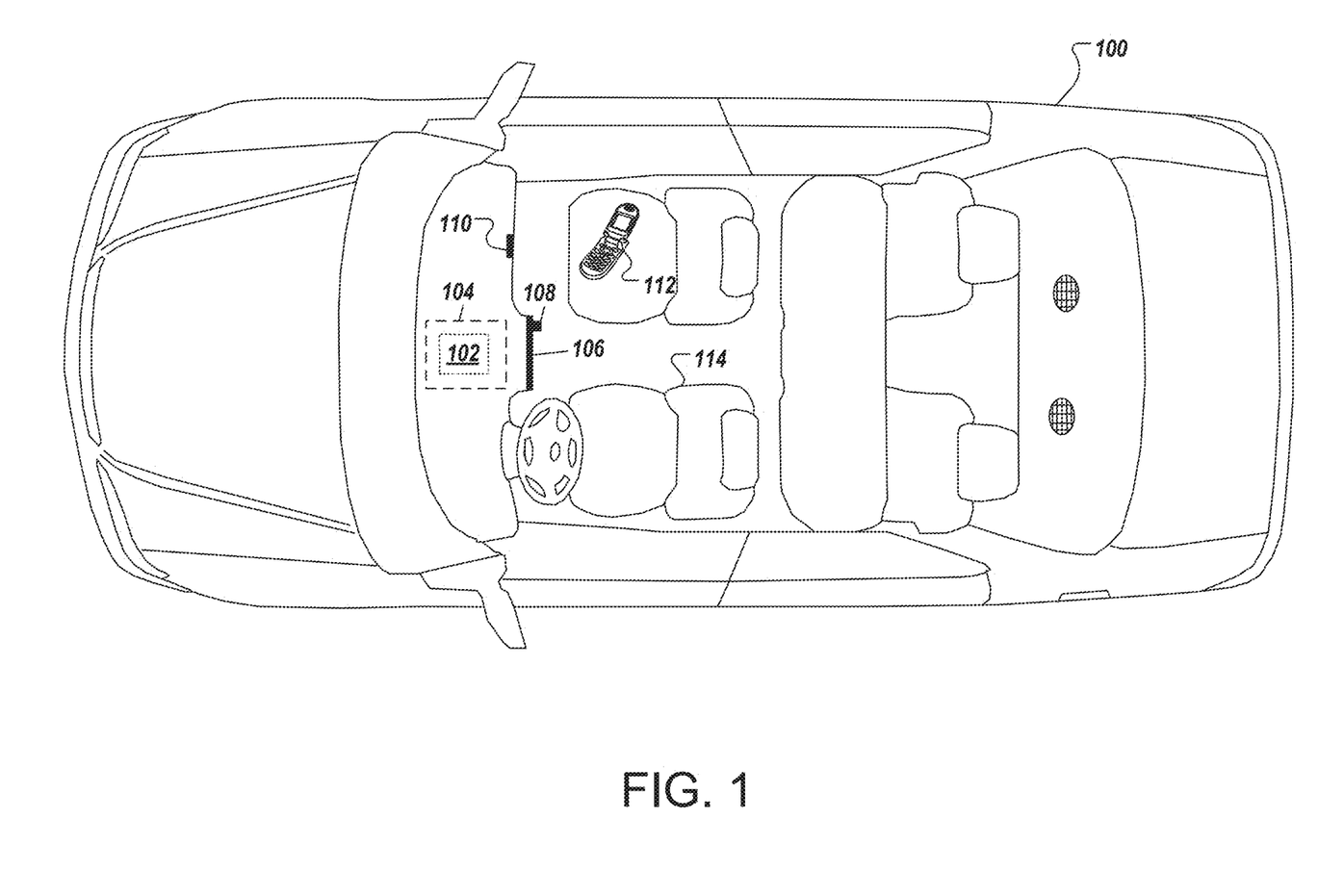
FIG. 1 illustrates a vehicle that includes a controller for managing vehicle information and transmission.

Referring to FIG. 1, while operating (or sitting idle) a vehicle can generate a considerable amount of information that can be analyzed for potentially improving the performance of the vehicle. To perform such analysis, portions of the information may be transmitted to a location off-board the vehicle. Under some driving conditions, e.g., driving the long straightaways of a rural area, operations of the vehicle may not change over considerable periods of time (e.g., roughly the same speed and driving direction may be maintained). As such, some operational information may not considerably change for a period of time and would not need to be frequently transmitted from the vehicle for analysis. Information of more interest may coincide with the occurrence of particular events. For example, performing an analysis on information associated with an abrupt change in vehicle operation may be of particular interest. Additionally such events may provide insight into techniques for potentially improving vehicle performance. For example, due to the repeated occurrence of one or more events, a different type of vehicle may better lend itself to the driving conditions being experienced such as different types of traveled routes, environments (e.g., highway, city, rural, etc.), etc.

Under some conditions, analysis of the operational information may suggest that particular vehicles, types of vehicles, etc. may be optimum. For example, some environments and driving conditions may lend well for conventional internal combustion based vehicles while alternative fuel vehicles, which may solely rely upon non-petroleum energy sources (e.g., electricity, natural gas, biofuels etc.), may be better suited for other environments. Other vehicles that may prove to be optimum may include hybrid vehicles that employ two or more distinct power sources (e.g., an electric motor and an internal combustion engine—referred to as a hybrid electric vehicle or HEV). Some hybrid vehicles (referred to as plug-in hybrid vehicles) may operate by using energy storage devices that can be replenished (e.g., rechargeable batteries). In some arrangements, for electrical energy storage devices, one or more techniques may be implemented for charging and recharging the devices. For example, batteries may be charged through regenerative braking, strategic charging techniques, etc. during appropriate operating periods of the vehicle. In general, energy is typically lost as heat in conventional braking systems; however a regenerative braking system may recover this energy by using an electric generator to assist braking operations. Some systems and techniques may also strategically collect (e.g., leech) energy from the combustion engine during periods of efficient operation (e.g., coasting, traveling, etc.) and later assist the engine during periods of lesser efficiency. For such vehicles, the electric generator can be a device separate from the electric motor, considered as a second operating mode of the electric motor, or implemented through one or more other techniques, individually or in combination. Energy recovered by regenerative braking may be considered insufficient to provide the power needed by the vehicle. To counteract this lack of energy, the electric motor may be engaged during defined periods to assist the combustion engine. One or more control strategies may be used to determine these time periods. Similarly, periods of time may also be determined to engage regenerative braking and strategic charging in order to replenish energy storage. Other operations of the vehicle (e.g., accelerate, decelerate, gear changes, etc.) may also be defined for the control strategies. By developing such strategies to control the assistance provided to combustion engines (e.g., during low efficiency periods), energy may be conserved without negatively impacting vehicle performance. Along with such strategies, individual vehicles, types of vehicles, etc. may be selected for use based on the operational environment.

Some vehicle manufacturers may recommend operations and control strategies for entire classes of vehicles or other types of large vehicle groups (e.g., same model vehicles, same vehicle line, etc.) at particular times (e.g., at the release of the vehicle line). Similarly, the level of assistance provided by an electric motor or other type of alternative fuel system may be a constant. Being rather static, such recommendations do not account for the environment in which the vehicle is operated. Route specific information (e.g., vehicle is driven under highway, city, rural, etc. conditions), driver information (e.g., driver accelerating and braking tendencies, etc.) and other types of environmental information (e.g., time of day, season, etc.) are not accounted for in determining the appropriate operational strategies. Furthermore, vehicle selection is typically determined without consulting such route and environmental information. Typically a vehicle is selected absent this information because there is no other option (e.g., the driver has access to a single vehicle) or no information is provided for vehicle management (e.g., a vehicle is randomly assigned to a driver, such as a delivery truck). Absent taking steps to attain, analyze and use such information for vehicle selection, poor performance may occur along with related negative impacts (e.g., reduced fuel efficiency, increased operating costs, etc.). One or more techniques may be implemented for appropriately selecting a vehicle, type of vehicle, etc. for operating in a particular environment. For example, data reflective of vehicles operating in the environment may be used for selecting a vehicle, which type of vehicle, etc. Vehicle selection may also identify that one vehicle type (e.g., a combustion engine based vehicle) be converted into another vehicle type (e.g., hybrid vehicle) to improve performance (e.g., fuel efficiency, costs, etc.). Such operational data from vehicles may be used for other types of analysis. For example, vehicle operational data may be used for analysis to improve recommended operations and control strategies for a vehicle, type of vehicle, etc. For example, hybrid conversions may be more advantageous (e.g., reduced fuel consumption) for lower speed environments and less advantageous in high speed environments.

One or more techniques may be employed for making such selections or other types of analysis. For example, from the vehicle operational parameters (e.g., operating speed, fuel economy, etc.) one or more metrics (e.g., performance metrics) may be calculated. In turn, the metrics may be utilized for further analysis. For example, along with using the information for vehicle selection, vehicle type selection, etc., converting one vehicle type (e.g., a combustion engine based vehicle) into another vehicle type (e.g., hybrid vehicle) may be determined through use of the operational parameters and metrics to achieve performance improvements in fuel efficiency, costs, etc.

As shown in FIG. 1, an example vehicle 100 (e.g., a hybrid automobile) is capable of collecting operational parameters for use in various analysis (e.g., identifying an appropriate vehicle, type of vehicle, etc. for operating in a particular environment). To provide this capability, the vehicle includes a vehicle information manager 102 (here embedded in the dashboard of the vehicle 100) that may be implemented in hardware (e.g., a controller 104), software (e.g., executable instructions residing on a computing device contained in the vehicle), a combination of hardware and software, etc. In some arrangements, the vehicle information manager 102 may operate in a generally autonomous manner for data collection, data transmission and other types of functionality. To collect vehicle operational information, data may be collected from one or more inputs. For example, the vehicle information manager 102 may communicate with one or more portions of the vehicle. A variety of sensors, components, processing units, etc. of the vehicle may exchange data with the vehicle information manager 102. For example, operational parameters of the vehicle such as speed, acceleration, fuel consumption, etc., may be collected over time (e.g., as the vehicle operates) and provided to the vehicle informational manager 102. Location information (e.g., from a global positioning system receiver present in the vehicle) may also be collected by the vehicle information manager 102 to provide a record of the ground covered during vehicle operation. Similarly, data representing the direction that the vehicle is being driven may be provided to the vehicle information manager 102. Fuel consumption, temperature (e.g., of one or more vehicle components), etc. may be collected and provided. One or more timing signals can be collected, generated, etc. by the vehicle information manager 102. For example, a timing signal may be produced that represents the instances in which the vehicle's speed, location, etc. was sampled (e.g., every two seconds, etc.). Other type of operational parameters may also be provided from the vehicle; for example, data representing braking, steering, etc. may also be provided to the vehicle information manager 102. For example, a measure of braking pedal displacement, accelerator pedal displacement, displacement of a clutch pedal, etc. Vehicle components that provide information to the information manager 102 may also include interface modules, circuitry, etc. for controlling the operations of the combustion engine, the electrical motor, etc.

In some situations, data from sources other than the vehicle may also be collected. For example, user input may be provided. In this arrangement, the vehicle 100 includes an electronic display 106 that has been incorporated into its dashboard to present information such as selectable entries regarding different topics (e.g., operator ID, planned vehicle operations, trip destination, etc.). Upon selection, representative information may be gathered and provided to the vehicle information manager 102. To interact with the electronic display 106, a knob 108 illustrates a potential control device; however, one or more other types of devices may be used for user interaction (e.g., a touch screen display, etc.). Similar to using one or more sensors to collect operational data, other types of information may also be gathered; for example, a sensor 110 (here embedded in the dashboard of the vehicle 100) may collect information such as cabin temperature, location of the vehicle (e.g., the sensor being a GPS receiver) and other types of information. By collecting information such as GPS location, additional information may be provided to the vehicle information manager 102 (e.g., current location, start location, destination information) which may be used for quantifying vehicle performance. In some arrangements, information from other vehicles may be used by the vehicle information manager 102. For example, data may be collected from a fleet of vehicles (e.g., similar or dissimilar to the vehicle 100) and used, for example, in data comparisons. While one sensor 110 is illustrated in this example, multiple sensors may be located internally or externally to the vehicle for information collection (e.g., internal or external temperature or various vehicle components, etc.). One or more devices present in the vehicle 100 may also be used for information collection; for example, handheld devices (e.g., a smart phone 112, etc.) may collect and provide information (e.g., location information, identify individuals present in the vehicle such as vehicle operators, etc.) for use by the vehicle information manager 102 (e.g., identify driving characteristics of a vehicle operator). Similarly, portions of the vehicle itself (e.g., vehicle components) may collect information for the vehicle information manager 102; for example, one or more of the seats of the vehicle 100 (e.g., driver seat 114) may collect information (e.g., position of the seat to estimate the driver's weight) to provide to the vehicle information manager 102. Similar to data directly provided by one or more sensors, processed data may also be provided to the vehicle information manager 102. For example, gathered information may be processed by one or more computing devices (e.g., controllers) before being provided to the vehicle information manager 102.

In some arrangements, along with collecting information at the vehicle, remotely located information sources may be accessed by the vehicle. Once the vehicle information is collected, the data may be prepared and transmitted by the vehicle information manager 102 (along with assistance from the controller 104) to one or more locations by employing one or more communication techniques and methodologies. For example, wireless communication techniques (e.g., radio frequency, infrared, etc.) may be utilized that call upon one or more protocols and/or standards (e.g., the IEEE 802.11 family of standards such as WI-FI, the International Mobile Telecommunications-2000 (IMT-2000) specifications such as 3rd generation mobile telecommunications (3G), 4th generation cellular wireless standards (4G), wireless technology standards for exchanging data over relatively short distances such as BLUETOOTH, etc.). While the figure illustrates the vehicle information manager 102 (and the controller 104) as being entirely located onboard the vehicle 100, some or all of the functionality of the vehicle information manager 102 may be provided from one or more other locations (including remote locations). In one such arrangement, vehicle equipment (e.g., sensors) may provide (e.g., stream) raw data to a remotely located vehicle information manager by employing one or more communication techniques and methodologies.

Figure 2:
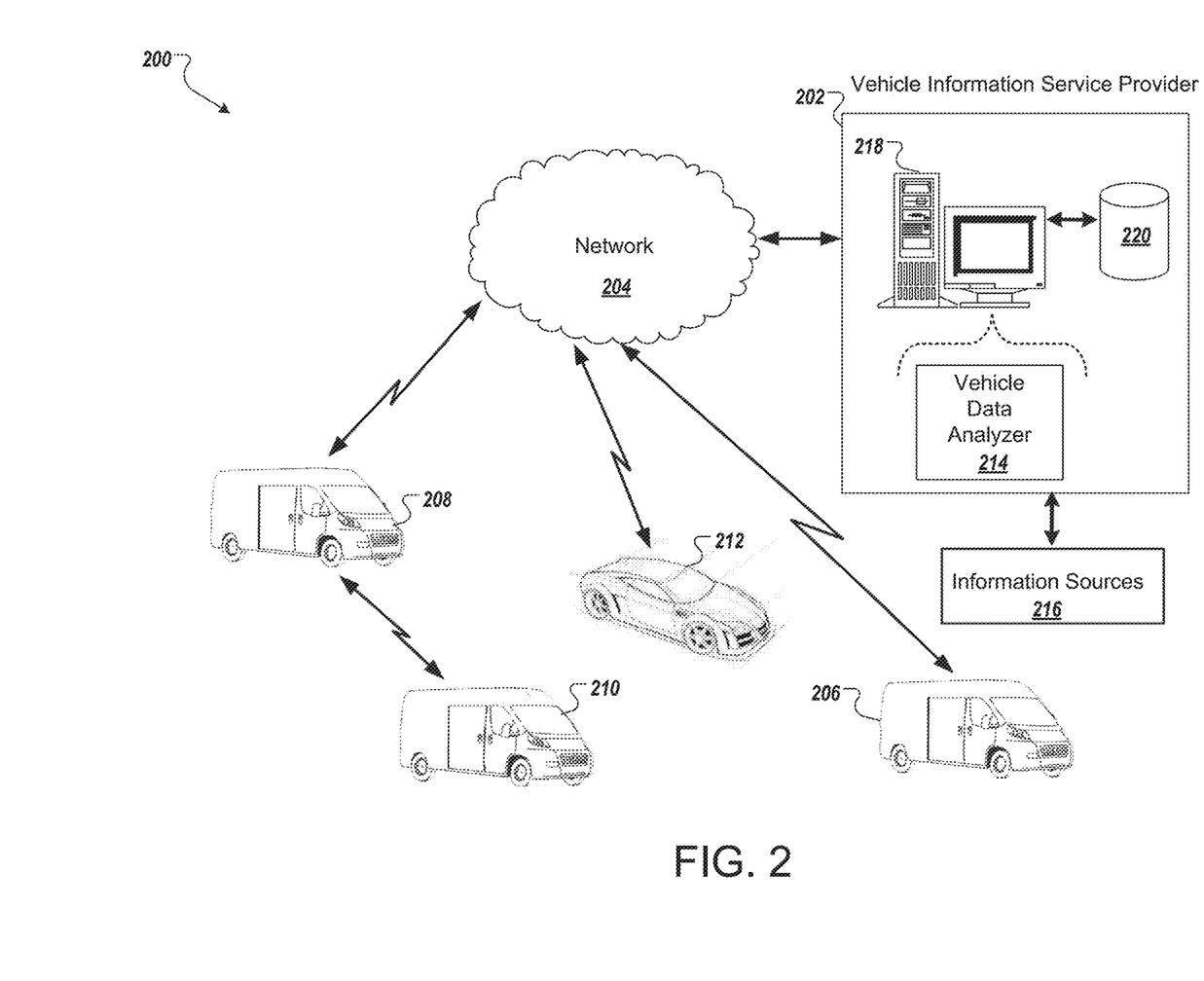
FIG. 2 illustrates a network-based vehicle analyzer for processing data transmitting from various vehicles.

Referring to FIG. 2, an information exchanging environment 200 is presented that allows information to be provided to a central location for storage and analysis (e.g., determining which vehicle, vehicle type, etc. should be operated in particular environments). In general, the information is collected from individual vehicles or other information sources for the analysis. One or more techniques and methodologies may be implemented; for example, one or more communication techniques and network architectures may be used to exchange information. In the illustrated example a vehicle information service provider 202 communicates through a network 204 (e.g., the Internet, an intranet, a combination of networks, etc.) to exchange information with a collection of vehicles (e.g., a small fleet of supply trucks 206, 208, 210, and an automobile 212). Each of the vehicles may employ one type of propulsion system (e.g., a combustion engine, an electric motor, etc.) or a combination of system (e.g., a hybrid vehicle).

In some arrangements, the network architecture may be considered as including one or more of the vehicles. For example, vehicles may include equipment for providing one or more network nodes (e.g., supply truck 208 functions as a node for exchanging information between the supply truck 210 and the network 204). As such, the information exchanging capability may include the vehicles exchanging information with the vehicle information service provider 202 and other potential network components (e.g., other vehicles, etc.).

One or more technologies may be used to exchange information among the vehicle information service provider 202, the network 204 (or networks) and the collection of vehicles. For example, wireless technology (capable of two-way communication) may be incorporated into the vehicles to exchange information with the vehicle information service provider 202. Along with providing and collecting information (e.g., operational parameters) from the vehicles, the vehicle information service provider 202 may be capable of processing information (e.g., in concert with a vehicle data analyzer 214 to analyze data (e.g., determine vehicles for possible selection, conversion, etc.) and executing related operations (e.g., store collected and processed information).

In some arrangements, the vehicle information service provider 202 may operate as a single entity; however, operations may be distributed among various entities to provide the functionality. In some arrangements, some functionality (e.g., operations of the vehicle data analyzer 214) may be considered a service, rather than a product, and may be attained by entering into a relationship with the vehicle information service provider 202 (e.g., purchase a subscription, enter into a contractual agreement, etc.). As such, the vehicle information service provider 202 may be considered as being implemented as a cloud computing architecture in which its functionality is perceived by users (e.g., vehicle operators, business operators, vehicle designers and manufacturers, etc.) as a service rather than a product. For such arrangements, users may be provided information (e.g., vehicle or vehicle type selections for operating in particular environments, vehicle selections for conversion into hybrid vehicles, etc.) from one or more shared resources (e.g., hardware, software, etc.) used by the vehicle information service provider 202. For service compensation, one or more techniques may be utilized; for example, subscription plans for various time periods may be implemented (e.g., a time period for monitoring use of vehicles or vehicle types in particular environments, analyzing if new technology should be incorporated into or used to replace vehicles, etc.).

Along with information being provided by one or more vehicles (e.g., received through the network 204, etc.), the vehicle information service provider 202 may utilize data from other sources. For example, information sources 216 external to the vehicle information provider 202 may provide vehicle related information (e.g., manufacturer recommendations for performance, vehicle load conditions, etc.), environmental information (e.g., current road conditions where the vehicle is operating, traffic conditions, topographical information, weather conditions and forecasts, etc.). In some arrangements, the information sources 216 may be in direct communication with the vehicle information service provider 202; however, other communication techniques may also be implemented (e.g., information from the information sources 216 may be provided through one or more networks such as network 204).

In the illustrated example, to provide such functionality, the vehicle information service provider 202 includes a server 218 that is capable of being provided information by the network 204 and the information sources 216. Additionally, the server 218 is illustrated as being in direct communication with a storage device 220 that is located at the vehicle information service provider 202 (however, remotely located storage may be accessed by the server 218). In this example, the functionality of the vehicle data analyzer 214 is located off-board the vehicle while the functionality of the vehicle information manager 102 (shown in FIG. 1) is located on-board the vehicle. In some examples, some functionality of the vehicle data analyzer 214 and the vehicle information manager 102 may be executed at other locations, distributed across multiple locations, etc. In one arrangement, a portion of the functionality of the vehicle data analyzer 214 may be executed on-board a vehicle or a portion of the vehicle information manager 102 may be executed at the vehicle information service provider 202. Provided the information from the one or more of sources, a variety of analysis may be developed by the vehicle data analyzer 214. For example, one or more performance metrics may be computed (e.g., from operational parameters), managed, stored etc. Comparisons between performance metrics (e.g., for a variety of vehicles, vehicle types, etc.) may also be calculated with or without employing one or more performance standards. Along with determining such metrics, comparisons, etc., functionality of the vehicle data analyzer 214 may include initiating the delivery of information (e.g., to service subscribers, entities, vehicles, etc.). One or more database systems, data management architectures and communication schemes may be utilized by the vehicle data analyzer 214 for information distribution. While a single server (e.g., server 218) is implemented in this arrangement to provide the functionality for the vehicle information service provider 202, additional servers or other types of computing devices may be used to provide the functionality. For example, operations of the vehicle data analyzer 214 may be distributed among multiple computing devices in one or more locations.

Figure 3:
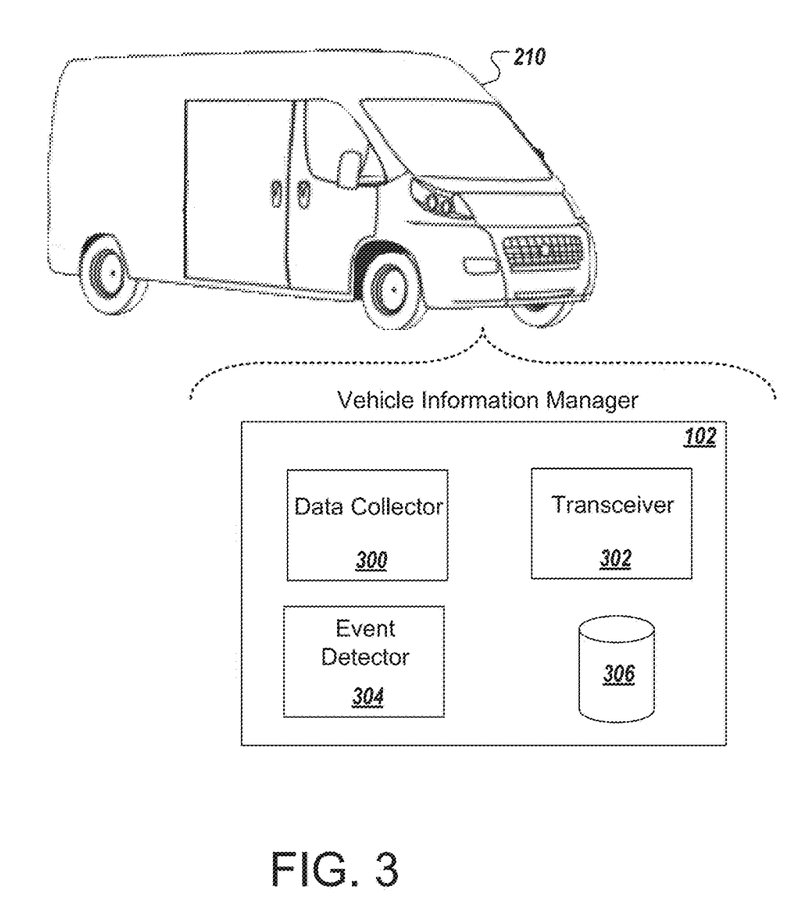
FIG. 3 illustrates portions of a controller included in a vehicle for controlling the transmission of information associated with the vehicle.

Referring to FIG. 3, one of the vehicles presented FIG. 2 (i.e., vehicle 210) illustrates potential components included in the vehicle information manager 102, which may be implemented in hardware, software, a combination of hardware and software, etc. One included component for this arrangement is a data collector 300 that is capable of interfacing various components of the vehicle to collect vehicle-related information such as operational parameters. Additionally, the vehicle data collector 300 may be capable of collecting information from other sources external to the vehicle. Also included is a transceiver 302 that is capable of transmitting information from the vehicle to one or more locations (e.g., the vehicle information service provider 202). While the transceiver 302 is also capable of receiving information (e.g., from the vehicle information service 202), in some arrangements such a capability may be absent (thereby only allowing for transmission of information).

The vehicle information manager 102 may implement one or more techniques to improve the efficiency of transmitting information from the vehicle. For example, rather than simply transmitting all of the data (e.g., operational parameters) collected from the vehicle (by the data collector 300), techniques may be employed to reduce the amount of potentially unneeded transmissions and thereby improve efficiency and reduce costs. For example, rather than transmitting collected information at a relatively constant rate (e.g., as each segment of data is ready for transmission), one or more events may be defined and used as triggers for transmitting data. Such events may be associated with situations that occur during the operation of the vehicle 210 (although events may also be defined for situations that occur off-board the vehicle). In one instance, an event could be defined by one or more predefined rules associated with operations of the vehicle, activities detected in the vehicle, etc. For example, attaining a particular speed, acceleration, deceleration, fuel consumption level, etc., can be considered such an event which triggers the transmission of information (e.g., time series data of the speed, acceleration, etc.) to one or more locations (e.g., the vehicle information service provider 202). Events may also be associated with vehicle location, route being driven, etc. For example, based upon the GPS coordinates of the vehicle, travel direction, etc., the vehicle may stray from a predefined route and more information may be sent from the vehicle to the service provider 202. Activities of the vehicle driver may also be used to define one or more events. For example, displacement of the vehicle's accelerator pedal, brake pedal, etc. (due to the driver) may extend beyond a predefined amount and trigger the transmission of information from the transceiver 302. Detecting such predefined events may be implemented by employing one or more techniques, for example, the vehicle information manager 102 may include an event detector 304. In this arrangement, information such as operational parameters (e.g., collected by the data collector 300) is monitored by the event detector 304 to determine if one or more rules have been satisfied to declare a predefined event (or multiple events) as being detected. In some arrangements, the event detector 304 may use a series of predefined rules (e.g., "vehicle speed has exceeded 80 mph", "battery charge is below 20%", etc.) to determine if one or more events has occurred. In some arrangements, multiple rules may need detection before an event is considered to have occurred. For example, rules may reflect hysteresis by depending upon both current conditions of the vehicle and past conditions. To assist the operations of the event detector 304, the transceiver 302 and the data collector 300, one or more data storage techniques may be employed by the vehicle information manager 102. As illustrated, one or more storage devices (e.g., memory components, hard drives, etc.) such as storage device 306 may be included in the vehicle information manager 102. Also with assisting with the operations of the information manager components, the storage device 306 may also be considered as providing a data store for information such as operational parameters (collected during the operation of the vehicle) that can be later accessed. For example, after traveling its route, collected data may retrieved from the storage device 306 (e.g., by the vehicle owner, the vehicle information service provider 202, etc.) for analysis to quantify performance, to compare performance with other vehicles, etc.

Once a predefined event or multiple events have been detected (e.g., by the event detector 304), one or more type of changes may be introduced for transmitting data from the vehicle 210 to one or more locations (e.g., the vehicle information service provider 202). In one arrangement, upon detection the amount of information being transmitted increases, e.g., to allow for a more detailed analysis to be performed (by the vehicle information service provider 202). To increase the amount of information, one or more techniques may be utilized such as including more information in transmissions. For example, different information (e.g., a time series of pedal displacement) may be transmitted based upon the event detected (e.g., the vehicle brake pedal being abruptly stepped on by the driver). In some arrangements this additional data to be included in transmissions may be defined along with the event. Data transmission properties may also be changed upon the detection of an event (by the event detector 304) to increase the amount of information being sent. For example, prior to detection, information may be transmitted (e.g., from the transceiver 302) at one frequency and post detection the transmission frequency may be increased (e.g., for a period of time). Bursts of information may be sent from the vehicle to the vehicle information service provider 202 due to event detection. Similar to adjusting transmission characteristics for a single period of time (e.g., increase transmission frequency for a period of time and then return to the original transmission frequency), such characteristics may be periodically adjusted. For example, based upon an event being detected, a repetitive sequence of higher transmission frequency periods followed by lower transmission frequency periods may be employed by the transceiver 302. As such, a sequence of information bursts followed by periods of less information being transmitted may be utilized for efficient data transfer. Similar to frequency, other transmission properties involving compression, modulation schemes, etc. may be changed due to the detection of an event (by the event detector 304).

Figure 4:
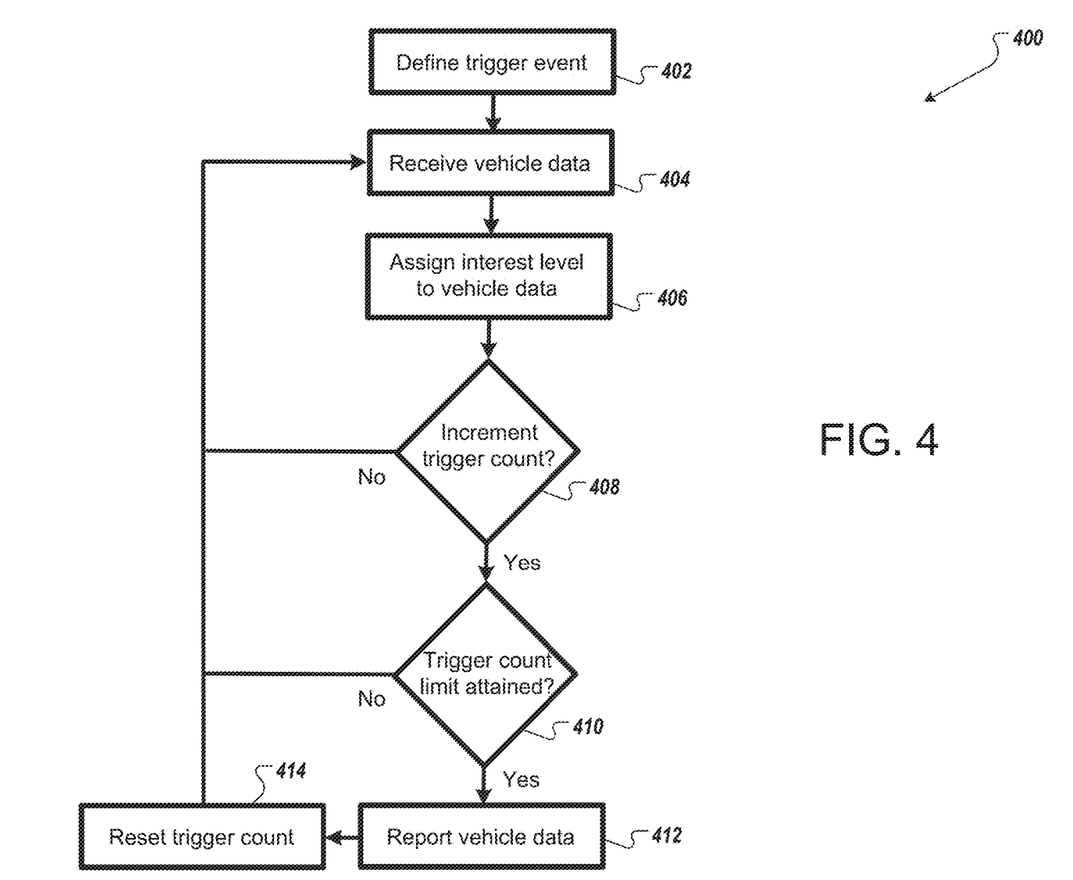
FIG. 4 illustrates a flowchart of operations of a vehicle controller capable of controlling the transmission of vehicle information.

Referring to FIG. 4, a flow chart 400 of the vehicle information manager 102 is presented that represents one arrangement for detecting if an event has occurred and executing corresponding operations depending upon the detection. In general, the operations establish a count to measure the number of occurrences for a particular event.

Upon a particular count being attained, information is transmitted from the vehicle to one or more recipients (e.g., the vehicle information service provider 202). As provided in the figure, operations initiate with defining 402 a trigger event. Typically the trigger event is defined and stored prior to the operation of the vehicle, but in some arrangements, such events may be defined ("on the fly") while the vehicle is under operation. Next, and while the vehicle is under operation, vehicle data such one or more operational parameters is received 404 by the vehicle information manager 102. For example, a temperature reading for one or more components of the vehicle may be received by the vehicle information manager 102 from one or more sensors, subsystems, etc. on-board the vehicle. Upon receiving the vehicle data, the vehicle information manager 102 may assign 406 an interest level to the vehicle data. For example, a score may be assigned to each received temperature reading based upon factors such as temperature value, the vehicle component from which the reading has been measured, etc. In some arrangements, one or more thresholds may be employed such that if the received data broaches one or more of the thresholds, a score (e.g., a binary value) can be assigned. After the score is assigned to the received vehicle data, the vehicle information manager 102 determines 408 if a counter associated with the predefined event should be incremented based upon the received vehicle data (e.g., based on the assigned score attaining a value, the counter is incremented). By incrementing the count represented by the counter, the vehicle data needs to demonstrate that multiple detections of the event have occurred (unless the counter is set for a single occurrence of the event). If determined that the count should not be incremented, the vehicle information manager returns to receive more vehicle data. If determined that incrementing is appropriate, action is taken (e.g., the respective counter is incremented) and the vehicle information manager 102 determines 410 if the count value (held by the counter) has attained a predefined limit. For example, if the number of instances that component temperatures has exceeded a predefined limit, more information may need to be sent from vehicle information manager 102 to the vehicle information service provider 202 for analysis. If the predefined count has not been attained, the vehicle information manager 102 returns to receive more vehicle data. If the count has been attained, the vehicle information manager 102 may take actions such as reporting 412 the vehicle data to the vehicle information manager 102. To report the information, one or more transmission parameters may be adjusted by the vehicle information manager 102. For example, the amount of information being transmitted may be increased, the transmission frequency may be increased, etc. After the reporting the vehicle data, the vehicle information manager 102 may return to receive more vehicle data (e.g., operational parameters) and repeat the operations after resetting 414 the trigger count. Along with resetting the count, other operations may be executed. For example, one or more transmission parameters may be returned as previously used (e.g., decrease amount of information being sent, return to original transmission frequency, etc.). In some arrangements, the same type of vehicle data may be received and processed upon returning (to step 404), or, vehicle information manager 102 may focus on another type of information associated with the vehicle to determine if a transmission adjustment is warranted.

Figure 5:
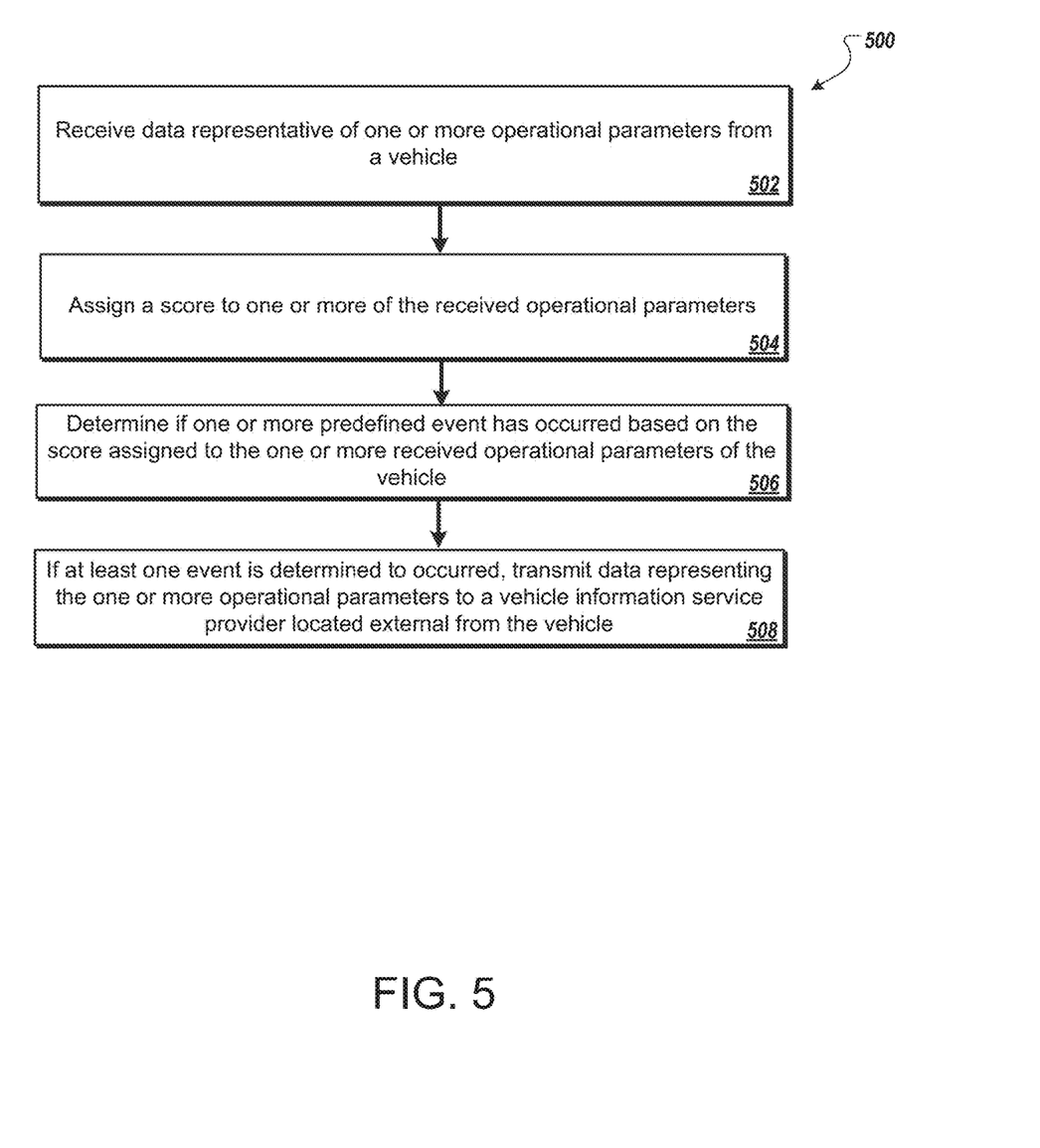
FIG. 5 illustrates a flowchart representative of operations of a vehicle controller.

Referring to FIG. 5, a flowchart 500 represents operations of a computing device, such as a controller (e.g., the controller 104 shown in FIG. 1) executing a vehicle information manager 102 (also shown in FIG. 1). In general, executed operations use data that represent operational parameters of a vehicle to determine if adjustments are needed to the transmission technique being used to send the operational parameters to one or more locations (e.g., a vehicle information service provider 202, shown in FIG. 2). Based on the transmission adjustments, additional vehicle information may be used in analyzing the performance of the vehicle. Such operations (e.g., of the vehicle information manager 102) are typically executed by components (e.g., processors, etc.) included in a single computing device (e.g., a computing device such as the on-board controller 104); however, operations may be executed by multiple computing devices. Along with being executed at a single site (e.g., onboard a vehicle, etc.), operation execution may be distributed among two or more locations.

Operations may include receiving 502 data representative of one or more operational parameters from a vehicle. Such parameters may represent information such as vehicle speed, component temperature, brake pedal position, acceleration, fuel consumption, etc. and may be received from one or more sensors located onboard a vehicle or from other information sources. Operations may also include assigning 504 a score to one or more of the received operational parameters. For example, an assigned score may reflect an interest level in a received operational parameter (e.g., sudden brake pedal position changes may be of considerable interest and highly scored). Operations may also include determining 506 if one or more predefined event has occurred based on the score assigned to the one or more received operational parameters of the vehicle. For example, a counter may be incremented based on the assigned score and an event may be considered as occurring if the value stored by the counter exceeds a predefined value. If at least one event is determined to have occurred, operations may include transmitting 508 data representing the one or more operational parameters to a vehicle information service provider located external from the vehicle. For example, based on an event being detected (e.g., the position of a brake pedal has abruptly changed), data representing an operational parameter (e.g., a data series representing the position of the pedal position over time) potentially along with other parameters (e.g., vehicle deceleration, vehicle speed, etc.) may be sent to the vehicle information service provider for analysis or other types of data processing. In some arrangements, one or more transmission parameters may be adjusted for sending the information, for example, the amount of information being transmitted may be increased, the frequency of transmission may be increased, etc. to provide the vehicle information service provider with more in depth information for a complete analysis of vehicle performance.

Figure 6:
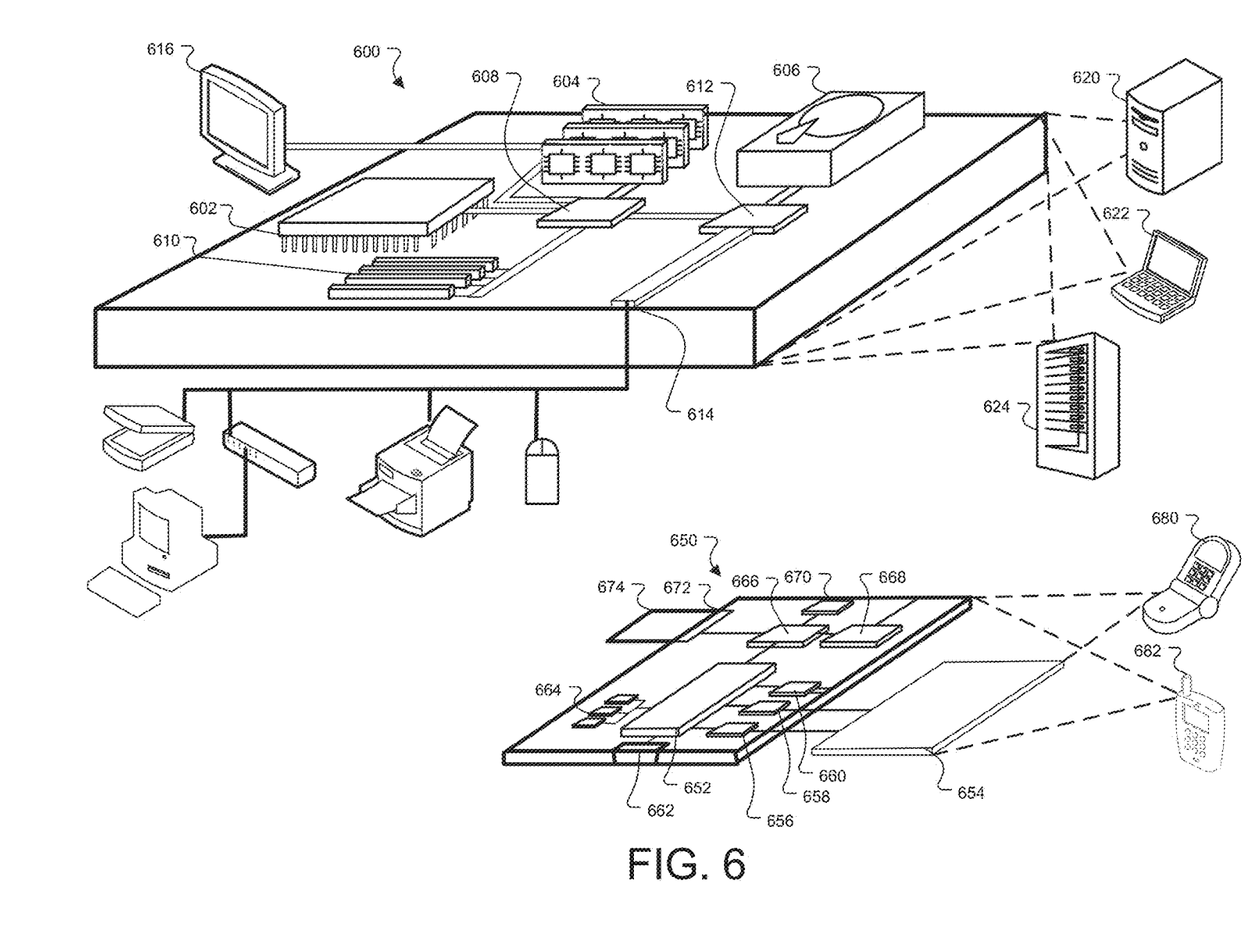
FIG. 6 illustrates an example of a computing device and a mobile computing device that can be used to implement the techniques described here.

FIG. 6 shows an example computer device 600 and example mobile computer device 650, which can be used to implement the techniques described herein. For example, a portion or all of the operations of an information manager (e.g., the vehicle information manger 102 shown in FIG. 1) and/or a vehicle analyzer (e.g., the vehicle data analyzer 214 shown in FIG. 2) may be executed by the computer device 600 and/or the mobile computer device 650. Computing device 600 is intended to represent various forms of digital computers, including, e.g., laptops, desktops, workstations, personal digital assistants, servers, blade servers, mainframes, and other appropriate computers. Computing device 650 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes processor 602, memory 604, storage device 606, high-speed interface 608 connecting to memory 604 and high-speed expansion ports 610, and low speed interface 612 connecting to low speed bus 614 and storage device 606. Each of components 602, 604, 606, 608, 610, and 612, are interconnected using various busses, and can be mounted on a common motherboard or in other manners as appropriate. Processor 602 can process instructions for execution within computing device 600, including instructions stored in memory 604 or on storage device 606, to display graphical data for a GUI on an external input/output device, including, e.g., display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

Memory 604 stores data within computing device 600. In one implementation, memory 604 is a volatile memory unit or units. In another implementation, memory 604 is a non-volatile memory unit or units. Memory 604 also can be another form of computer-readable medium, including, e.g., a magnetic or optical disk.

Storage device 606 is capable of providing mass storage for computing device 600. In one implementation, storage device 606 can be or contain a computer-readable medium, including, e.g., a floppy disk device, a hard disk device, an optical disk device, a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 604, storage device 606, memory on processor 602, and the like.

High-speed controller 608 manages bandwidth-intensive operations for computing device 600, while low speed controller 612 manages lower bandwidth-intensive operations. Such allocation of functions is an example only. In one implementation, high-speed controller 608 is coupled to memory 604, display 616 (e.g., through a graphics processor or accelerator), and to high-speed expansion ports 610, which can accept various expansion cards (not shown). In the implementation, the low-speed controller 612 is coupled to storage device 606 and low-speed expansion port 614. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router (e.g., through a network adapter).

Computing device 600 can be implemented in a number of different forms, as shown in the figure. For example, it can be implemented as standard server 620, or multiple times in a group of such servers. It also can be implemented as part of rack server system 624. In addition or as an alternative, it can be implemented in a personal computer (e.g., laptop computer 622). In some examples, components from computing device 600 can be combined with other components in a mobile device (not shown) (e.g., device 650). Each of such devices can contain one or more of computing device 600, 650, and an entire system can be made up of multiple computing devices 600, 650 communicating with each other.

Computing device 650 includes processor 652, memory 664, and an input/output device including, e.g., display 654, communication interface 666, and transceiver 668, among other components. Device 650 also can be provided with a storage device, including, e.g., a microdrive or other device, to provide additional storage. Components 650, 652, 664, 654, 666, and 668, may each be interconnected using various buses, and several of the components can be mounted on a common motherboard or in other manners as appropriate.

Processor 652 can execute instructions within computing device 650, including instructions stored in memory 664. The processor can be implemented as a chipset of chips that include separate and multiple analog and digital processors. The processor can provide, for example, for the coordination of the other components of device 650, including, e.g., control of user interfaces, applications run by device 650, and wireless communication by device 650.

Processor 652 can communicate with a user through control interface 658 and display interface 656 coupled to display 654. Display 654 can be, for example, a TFT LCD (Thin-Film-Transistor Liquid Crystal Display) or an OLED (Organic Light Emitting Diode) display, or other appropriate display technology. Display interface 656 can comprise appropriate circuitry for driving display 654 to present graphical and other data to a user. Control interface 658 can receive commands from a user and convert them for submission to processor 652. In addition, external interface 662 can communicate with processor 642, so as to enable near area communication of device 650 with other devices. External interface 662 can provide, for example, for wired communication in some implementations, or for wireless communication in other implementations. Multiple interfaces also can be used.

Memory 664 stores data within computing device 650. Memory 664 can be implemented as one or more of a computer-readable medium or media, a volatile memory unit or units, or a non-volatile memory unit or units. Expansion memory 674 also can be provided and connected to device 850 through expansion interface 672, which can include, for example, a SIMM (Single In Line Memory Module) card interface. Such expansion memory 674 can provide extra storage space for device 650, and/or may store applications or other data for device 650. Specifically, expansion memory 674 can also include instructions to carry out or supplement the processes described above and can include secure data. Thus, for example, expansion memory 674 can be provided as a security module for device 650 and can be programmed with instructions that permit secure use of device 650. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 664, expansion memory 674, and/or memory on processor 652, which can be received, for example, over transceiver 668 or external interface 662.

Device 650 can communicate wirelessly through communication interface 666, which can include digital signal processing circuitry where necessary. Communication interface 666 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, including, e.g., using a Bluetooth®, WiFi, or other such transceiver (not shown). In addition, GPS (Global Positioning System) receiver module 670 can provide additional navigation- and location-related wireless data to device 650, which can be used as appropriate by applications running on device 650.

Device 650 also can communicate audibly using audio codec 660, which can receive spoken data from a user and convert it to usable digital data. Audio codec 660 can likewise generate audible sound for a user, including, e.g., through a speaker, e.g., in a handset of device 650. Such sound can include sound from voice telephone calls, recorded sound (e.g., voice messages, music files, and the like) and also sound generated by applications operating on device 650.

Computing device 650 can be implemented in a number of different forms, as shown in the figure. For example, it can be implemented as cellular telephone 680. It also can be implemented as part of smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system. This includes at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for presenting data to the user, and a keyboard and a pointing device (e.g., a mouse or a trackball) by which the user can provide input to the computer. Other kinds of devices can be used to provide for interaction with a user as well. For example, feedback provided to the user can be a form of sensory feedback (e.g., visual feedback, auditory feedback, or tactile feedback). Input from the user can be received in a form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a user interface or a Web browser through which a user can interact with an implementation of the systems and techniques described here), or a combination of such backend, middleware, or frontend components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device-implemented method comprising:
receiving data representative of one or more operational parameters from a vehicle;
causing data representing the one or more operational parameters to be transmitted to a vehicle information service provider located external from the vehicle at a first transmission frequency;
determining if one or more predefined events has occurred based on the data received from the vehicle representative of the one or more operational parameters of the vehicle; and
if at least one of the one or more predefined events is determined to have occurred, causing the transmission of data representing the one or more operational parameters to be adjusted from the first transmission frequency to a second transmission frequency different than the first transmission frequency.

2. The computing device-implemented method of claim 1, wherein determining if the one or more predefined events have occurred includes incrementing a count to represent each occurrence of a respective event.

3. The computing device-implemented method of claim 1, wherein determining if the one or more predefined events have occurred includes determining if a count limit has been attained.

4. The computing device-implemented method of claim 1, wherein the data representing the one or more operational parameters transmitted at the second transmission frequency comprises at least one operational parameter distinct from the one or more operational parameters transmitted at the first transmission frequency.

5. The computing device-implemented method of claim 1, further comprising:
upon causing a transmission of the data representing the one or more operational parameters to the vehicle information service provider to be adjusted from the first transmission frequency to the second transmission frequency, resetting a count.

6. The computing device-implemented method of claim 1, further comprising:
upon causing a transmission of the data representing the one or more operational parameters to the vehicle information service provider to be adjusted from the first transmission frequency to the second transmission frequency, returning to operate with a previously used transmission technique.

7. The computing device-implemented method of claim 1, wherein the one or more operational parameters represents at least one of displacement of a pedal of the vehicle, speed of the vehicle, acceleration of the vehicle, deceleration of the vehicle, battery charge level of a battery of the vehicle, and steering inputs.

8. The computing device-implemented method of claim 1, wherein determining if the one or more predefined events have occurred is performed by a controller located in the vehicle.

9. A system comprising:
a computing device comprising:
a memory configured to store instructions; and
a processor connected to the memory and configured to execute the instructions to perform operations comprising:
receiving data representative of one or more operational parameters from a vehicle;
causing data representing the one or more operational parameters to be transmitted to a vehicle information service provider located external from the vehicle at a first transmission frequency;
determining if one or more predefined events has occurred based on the data received from the vehicle representative of the one or more operational parameters of the vehicle; and
if at least one of the one or more predefined events is determined to have occurred, causing the transmission of the data representing the one or more operational parameters to be adjusted from the first transmission frequency to a second transmission frequency different than the first transmission frequency.

10. The system of claim 9, wherein determining if the one or more predefined events have occurred includes incrementing a count to represent each occurrence of a respective event.

11. The system of claim 9, wherein determining if the one or more predefined events have occurred includes determining if a count limit has been attained.

12. The system of claim 9, wherein the processor is configured to execute the instructions to perform operations comprising:
upon causing a transmission of the data representing the one or more operational parameters to the vehicle information service provider, resetting a count.

13. The system of claim 9, wherein the processor is configured to execute the instructions to perform operations comprising:
upon causing a transmission of the data representing the one or more operational parameters to the vehicle information service provider, returning to operate with a previously used transmission technique.

14. The system of claim 9, wherein the one or more operational parameters represents at least one of displacement of a pedal of the vehicle, speed of the vehicle, acceleration of the vehicle deceleration of the vehicle, battery charge level of a battery of the vehicle, and steering inputs.

15. The system of claim 9, wherein determining if the one or more predefined events have occurred is performed by a controller located in the vehicle.

16. One or more nontransitory computer readable media storing instructions that are executable by a processing device, and upon such execution cause the processing device to perform operations comprising:
receiving data representative of one or more operational parameters from a vehicle;
causing data representing the one or more operational parameters to be transmitted to a vehicle information service provider located external from the vehicle at a first transmission frequency;
determining if one or more predefined events have occurred based on the data received from the vehicle representative of the one or more operational parameters of the vehicle; and
if at least one of the one or more predefined events is determined to have occurred, causing the transmission of the data representing the one or more operational parameters to be adjusted from the first transmission frequency to a second transmission frequency different than the first transmission frequency.

17. The computer readable media of claim 16, wherein determining if the one or more predefined events have occurred includes incrementing a count to represent each occurrence of a respective event.

18. The computer readable media of claim 16, wherein determining if the one or more predefined events have occurred includes determining if a count limit has been attained.

19. The computer readable media of claim 16, wherein the processing device performs operations further comprising:
upon causing a transmission of the data representing the one or more operational parameters to the vehicle information service provider, resetting a count.

20. The computer readable media of claim 16, wherein the processing device performs operations further comprising:
upon causing a transmission of the data representing the one or more operational parameters to the vehicle information service provider, returning to operate with a previously used transmission technique.

21. The computer readable media of claim 16, wherein the one or more operational parameters represents at least one of displacement of a pedal of the vehicle, speed of the vehicle, acceleration of the vehicle deceleration of the vehicle, battery charge level of a battery of the vehicle, and steering inputs.

22. The computer readable media of claim 16, wherein determining if one or more predefined event has occurred is performed by a controller located in the vehicle.

* * * * *